No. 712,978. Patented Nov. 4, 1902.
G. SYMMS, Jr.
HAY CURING FRAME.
(Application filed Mar. 26, 1902.)
(No Model.)

Witnesses
Edwin G. McKee
Chas. S. Hyer.

Inventor
George Symms Jr.
By Victor J. Evans
Attorney

UNITED STATES PATENT OFFICE.

GEORGE SYMMS, JR., OF AUGUSTA, GEORGIA, ASSIGNOR OF ONE-HALF TO MATTIE MOSELEY McCLUSKY, OF AUGUSTA, GEORGIA.

HAY-CURING FRAME.

SPECIFICATION forming part of Letters Patent No. 712,978, dated November 4, 1902.

Application filed March 26, 1902. Serial No. 100,085. (No model.)

*To all whom it may concern:*

Be it known that I, GEORGE SYMMS, Jr., a citizen of the United States, residing at Augusta, in the county of Richmond and State of Georgia, have invented certain new and useful Improvements in Hay-Curing Frames; and I do hereby declare the following to be a full, clear, and exact description of the invention, such as will enable others skilled in the art to which it appertains to make and use the same.

This invention relates to a hay-curing frame adapted to be used in a field to receive hay as cut; and the primary object of the same is to provide a simple and effective folding device of this character which can be readily set up in operative position or disconnected and stored in compact form and avoid by its use the usual custom of transferring hay from a field in wagons and also facilitating the curing of hay by permitting a circulation of air around, under, and over the quantity of hay placed therein.

A further object of the invention is to preserve hay after it has been cut through wet weather, the quantity of hay being placed within the device above the ground-surface and encourage a thorough ventilation or drying out without injury to the hay.

A further object of the invention is to save time in the handling of cut hay by having within the field or meadow means for directly receiving quantities of hay without requiring the usual transporting methods.

With these and other objects and advantages in view the invention consists in the novel construction and arrangement of the several parts, which will be more fully hereinafter described and claimed.

Figure 1:
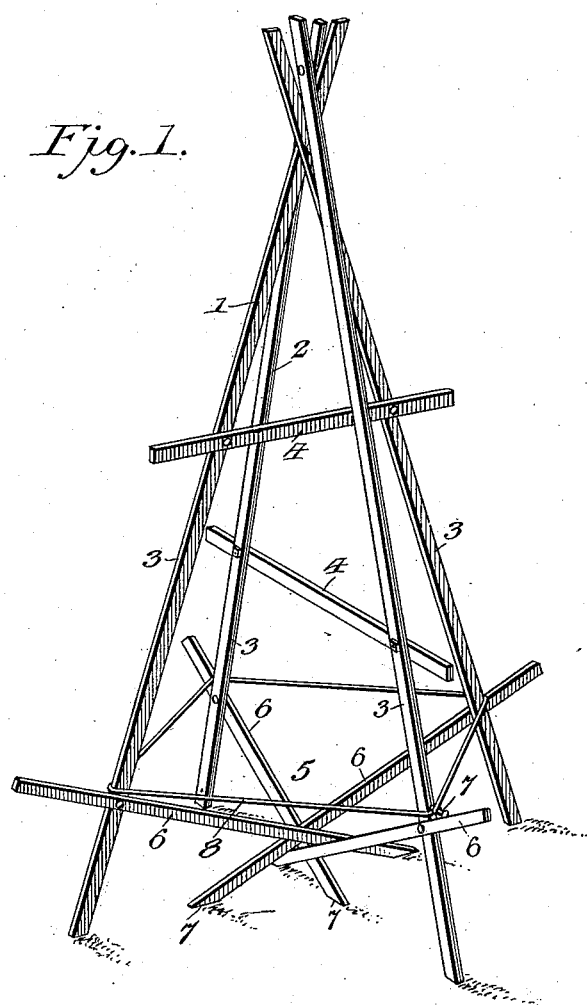
Figure 3:
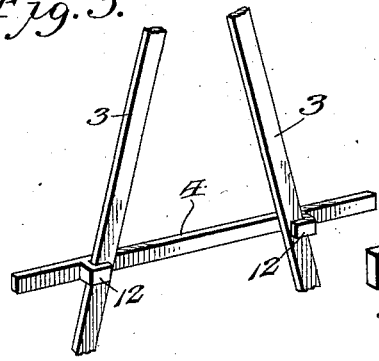
Figure 2:
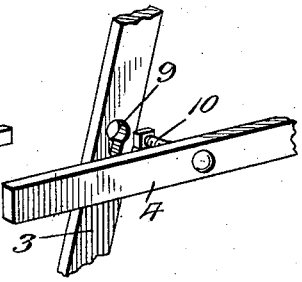
Figure 4:
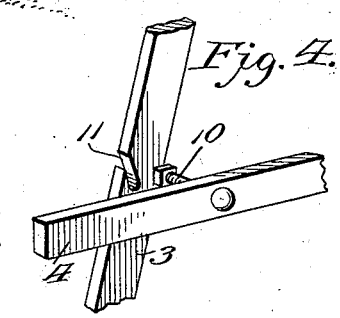

In the drawings, Figure 1 is a perspective view of a hay-curing frame embodying the features of the invention and set up in operative position. Fig. 2 is a detail perspective view of parts of the improved device, showing the manner of joining the same. Fig. 3 is a detail perspective view of parts of the device, showing a modification in the mode of connecting the same. Fig. 4 is a detail perspective view of a further modified form of connection between parts of the device.

Similar numerals of reference are employed to indicate corresponding parts in the several views.

The improved device comprises two members 1 and 2, each having a pair of elongated bars 3, which are pivotally attached at their upper extremities and serve as supporting-legs for the entire structure when the device is arranged in operative position. The bars 3 of the member 1 are pivoted at a point a greater distance below the upper ends of said bars than the pivotal point of the bars 3 of the member 2 for a purpose which will be hereinafter specified. The improved structure also comprises cross-braces 4, which are attached to the bars of the members 1 and 2 and disposed in horizontal position, one brace being used with each pair of bars and the latter arranged at an angle to each other and at different elevations to resist spreading of the bars 3 and also strengthen the latter to overcome any tendency to fracture by the weight strain of the hay imposed upon the entire device. The lower portion of the complete frame or device is in the form of a basket or rick bottom 5, which is formed by a series of inwardly and downwardly extending bars 6, secured to the bars 3 and having their inner ends cut away or beveled, as at 7, and adapted to rest upon the ground-surface within the confines of area of the lower ends of the bars 3, which are also disposed upon the ground-surface. The bars 6 are pivoted to the bars 3 and are adapted to be folded up against the latter when the parts of the device are arranged for storage or reduced to compact form. The basket or rick bottom also comprises a surrounding wire 8, which is passed around the bars 3 above the planes of attachment of the bars 6 thereto and secured at opposite points to headed pins or nails 7ª, driven into a part of the bars. This wire 8 serves as a retainer to prevent the hay placed in the device from falling out at the sides. The lower extremities of the bars 6 are crossed over each other in regular order, and by this means the hay is prevented from contacting with the ground-surface.

There are a number of methods or modes of attaching the braces 4 to the bars 3, and that shown by Fig. 1 is similar to the construction illustrated by Fig. 2, wherein the bars 3 are formed with keyhole-slots 9 and the braces 4 have nutted bolts 10, the nuts being retained on the bolts and slipped through the upper enlarged portions of the keyhole-slots and said bolts afterward pressed downwardly into the reduced lower extremities of said slots, when the nuts are tightened firmly and hold the braces in immovable position in relation to the said bars 3. By having the nuts retained on the bolts 10 loss of the same will be prevented, and the several parts of the entire frame structure will thereby always be ready for assemblage without the inconvenience which would result from a loss of the nuts.

In Fig. 4 a modified form of the means for connecting the braces 4 and the bars 3 is shown and is somewhat similar to that illustrated by Fig. 2, the nutted bolts 10 being used in this instance; but the bars have inclined slots 11 cut thereinto from one edge at a downward and inward inclination, so that the bolts may be easily slipped into the slots and the nuts afterward tightened.

The construction illustrated in Fig. 3 dispenses with the use of bolts, and in this instance the braces 4 have oppositely-disposed reversely-arranged clamping-hooks 12, which are slipped over the outer edges of the bars 3 by first applying the braces 4 at such an elevation that the distance between the edges of the bars 3 is less than the distance between the inner opposing ends of the hooks. The several forms of fastening the braces 4 to the bars 3 permit a ready application and separation of the said braces in setting up or reducing the frame.

In arranging the device for use the member 1 is first erected by spreading the bars 3 thereof apart a suitable distance, and the member 2 then has its bars separated and the upper extremity thereof pulled downwardly over that of the member 1. The bars 6 are then turned down inwardly in the position shown in Fig. 1 and the wire 8 passed around the bars 3 above the bars 6. The braces 4 are then attached to the bars 3, and when the parts are thus disposed the frame or curing device as an entirety will be held in rigid position for use and the bars 3 will be prevented from spreading. In collapsing or reducing the improved device to compact form the braces 4 are detached, the wire 8 released, and the bars 6 turned up against the bars 3, and after the independent members 1 and 2 have been separated the bars 3 can be drawn into close relation and all the parts held in compact form for storage. In the use of the device the hay is thrown or placed between the bars 3 and rests upon the basket or rick bottom 5 and may be stacked up between said bars 3 any suitable distance. As before indicated, the hay placed within the improved device will be held above the ground-surface, and the air is thereby permitted to circulate under the same, as well as around and above it, thereby tending to rapidly cure the quantity of hay so arranged and protecting it in wet weather by encouraging a run-off or drain of the water therefrom and a rapid drying out after the rain has ceased by reason of the thorough ventilation through, under, and over the hay resting upon the basket or rick bottom.

It will be understood that the proportions, dimensions, and minor details of the improved device can be varied at will without departing from the principle of the invention.

Having thus fully described the invention, what is claimed as new is—

1. A device of the class set forth comprising independent foldable members having bars pivotally attached adjacent to the lower ends thereof and adapted to be turned inwardly at a downward angle of inclination and crossed, and braces removably attached to the upper portions of the members.

2. A device of the class set forth comprising two members having bars pivoted adjacent their upper ends, the one member being adapted to be placed over the other, foldable bars pivoted adjacent to the lower ends of the bars of the member, braces removably attached to the bars of the members above the lower pivoted bars, and a strand surrounding the members adjacent to the lower pivoted bars.

3. A hay-curing frame comprising two independent members having bars pivoted to the lower portions thereof and adapted to be turned inwardly and downwardly and crossed to provide a basket or rick bottom, and means for preventing the members from spreading beyond a predetermined point of adjustment.

4. A hay-curing frame comprising two independent members pivoted adjacent to the upper end thereof and comprising bars with shorter bars pivotally attached adjacent their lower ends, braces removably applied to the independent members and disposed in planes at angles to each other, and a binding-strand passed around the members above the lower pivoted bars.

In testimony whereof I affix my signature in presence of two witnesses.

GEORGE SYMMS, JR.

Witnesses:
JNO. T. MCCLUSKY,
FRED T. LOCKHART.